United States Patent
Liao et al.

(10) Patent No.: US 6,855,391 B2
(45) Date of Patent: Feb. 15, 2005

(54) DOUBLE-SIDED HIGH-DENSITY INFORMATION STORAGE MEDIUM

(75) Inventors: Wen-Yih Liao, Taichung (TW); Chih-Ming Lin, Taichung (TW); Tzuan-Ren Jeng, Hsinchu Hsien (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 57 days.

(21) Appl. No.: 10/348,188

(22) Filed: Jan. 22, 2003

(65) Prior Publication Data

US 2004/0048031 A1 Mar. 11, 2004

(30) Foreign Application Priority Data

Sep. 9, 2002 (TW) ........................................ 91120491 A

(51) Int. Cl.$^7$ ................................................ B32B 3/02
(52) U.S. Cl. ................. 428/64.1; 428/64.4; 430/270.11
(58) Field of Search ............................... 428/64.1, 64.4, 428/913; 430/270.11, 495.1, 945

(56) References Cited

U.S. PATENT DOCUMENTS

| 5,059,473 | A | * | 10/1991 | Takahashi et al. | ........... 428/162 |
| 5,392,262 | A | * | 2/1995 | Finkelstein et al. | ....... 369/13.39 |
| 6,023,451 | A | * | 2/2000 | Kashiwagi et al. | ...... 369/275.5 |
| 6,159,572 | A | * | 12/2000 | Kobayashi et al. | ........ 428/64.1 |
| 6,291,047 | B1 | * | 9/2001 | Kobayashi et al. | ........ 428/64.1 |
| 2003/0026935 | A1 | * | 2/2003 | Lee et al. | ................... 428/64.4 |

* cited by examiner

Primary Examiner—Elizabeth Mulvaney
(74) Attorney, Agent, or Firm—Birch, Stewart, Kolasch & Birch, LLP

(57) ABSTRACT

A double-sided high-density information storage medium uses a laser pickup head with blue light and light of a shorter wavelength to read and save data in order to increase the data storage per unit area on the information storage medium. The invention further uses a double-sided high-density information storage medium and a double-sided recording stack structure to increase the storage capacity, forming a double-sided two-recording-layer and double-sided four-recording-layer information storage media.

22 Claims, 5 Drawing Sheets

DOUBLE-SIDED HIGH-DENSITY INFORMATION STORAGE MEDIUM

BACKGROUND OF THE INVENTION

1. Field of Invention

The invention relates to a double-sided high-density information storage medium and, in particular, to a double-sided high-density information storage medium that uses a short-wavelength laser pickup head to perform data reading and writing.

2. Related Art

There is an increasing demand for high storage density and capacity in the storage media of 3C (computer, communication, consumer electronics) products. Taking the optical information storage medium as an example, the compact disk (CD) specifications proposed by Philips and Sony together in 1982 have been widely accepted and used.

As the multimedia are having wider applications in the coming digital era, higher demands in audio/video (AV) effects are expected from users. Consequently, there is an increasing need for high storage density and capacity in the data storage media. In particular, the traditional CD specifications are no longer sufficient for digital AV effects. Taking the popular video compact disk (VCD) as an example, the screen quality is far worse than the normal video tapes and a single VCD can only record one hour of AV information. Therefore, Philips and Sony reached an agreement and proposed with other companies the specifications of digital versatile discs (DVD's) in April, 1996. The digital data storage capacity of a single DVD is 4.7 GB (Gigabyte), far more than the 650 MB (Megabyte) capacity of a single CD. Therefore, hardware for reading and playing DVD's has emerged and become part of the standard equipment. Many related DVD specifications are also developed in the meantime.

To integrate the current image signal playing modes and to pursue higher AV quality, the high-definition television (HDTV) playing technology has become the most advanced playing mode. Therefore, a whole new AV standard with high AV quality HDTV signals have become invented. HDTV is a new video signal display specification that supports the 1,920×1,080 resolution, uses a 16:9 display screen and a refreshing rate of 30 or 60 screens per second (the refreshing rate of the traditional television systems is 24 or 30). The storage capacity of optical disks thus faces a bottleneck. If 4.7 GB DVD's are used to high-quality AV signals for the HDTV, only 40 minutes of information can be recorded for each disk. The use of DVD's is thus greatly limited in the HDTV epoch.

Red-light laser is usually used as a pickup light source for optical information storage media but there is an optical interference limit that puts restriction on the recording density. The focal spot size of the optical pickup head and the wavelength are correlated. The focal spot size decreases as the wavelength of the pickup laser source becomes shorter, then the recording capacity per unit area is increased several times. The specifications for high-capacity optical storage media, such as the high-density digital versatile disc (HD-DVD), currently proposed by various manufacturing companies ask for blue or violet light with a shorter wavelength for the optical pickup head. From the above description, we see that defining optical disc specifications and structures that use short-wavelength lasers is the main stream of developing optical storage media in future.

SUMMARY OF THE INVENTION

To achieve the above objectives, the invention provides a double-sided high-density information storage medium to increase its capacity. Laser pickup heads with wavelengths shorter than or equal to blue light are used for reading and recording data, increasing the data storage capacity per unit medium area. We further use a double-sided four-recording-layer structure to increase the capacity.

The disclosed double-sided high-density information storage medium uses a short-wavelength laser pickup head to read and record data. The information storage medium contains: a substrate with a land-and-groove surface for laser tracking on both sides; a recording stack consisting of at least one information recording layer on each of the land-and-groove surfaces; and a cover layer on the surface of each recording stack for protection. Therefore, we have a double-sided two recording-layers high-density information storage medium.

Furthermore, to pursue information storage media with higher capacity and density, the invention provides a double-sided four-recording-layer high-density information storage medium. It contains: a substrate with a first land-and-groove surface for laser tracking on both sides; a recording stack on each of the land-and-groove surfaces; a separator layer formed on each of the recording stacks; another recording stack on each of the separator layer; each of the recording stacks separated by the separator layer consisting of at least one information recording layer; and a cover layer on the surface of the top and bottom recording stack of the substrate for protection. This then forms a double-sided four-recording-layer high-density information storage medium.

There is also a double-sided high-density information storage medium formed by combining two substrates. Two substrates with a one surface formed with a laser tracking land-and-groove surface are bonded together using the other surfaces. Each of the land-and-groove surfaces is formed with a recording stack that is comprised of at least one information recording layer. The recording stack surface is protected by a cover layer. One can form a double-sided four-recording-layer high-density information storage medium in a similar way.

The disclosed recording stack is comprised of at least one information recording layer. The materials of the information recording layer includes phase transition materials, organic materials or magneto-optical materials. In addition to the information layer, one can insert the other optical/thermal enhanced layers into the recording stack. The optical/thermal enhanced layers can be the materials such as dielectric, metal and thermal assistance layers.

BRIEF DESCRIPTION OF THE DRAWINGS

The invention will become more fully understood from the detailed description given hereinafter, and thus are not limitative of the present invention wherein.

DETAILED DESCRIPTION OF THE INVENTION

Figure 1:
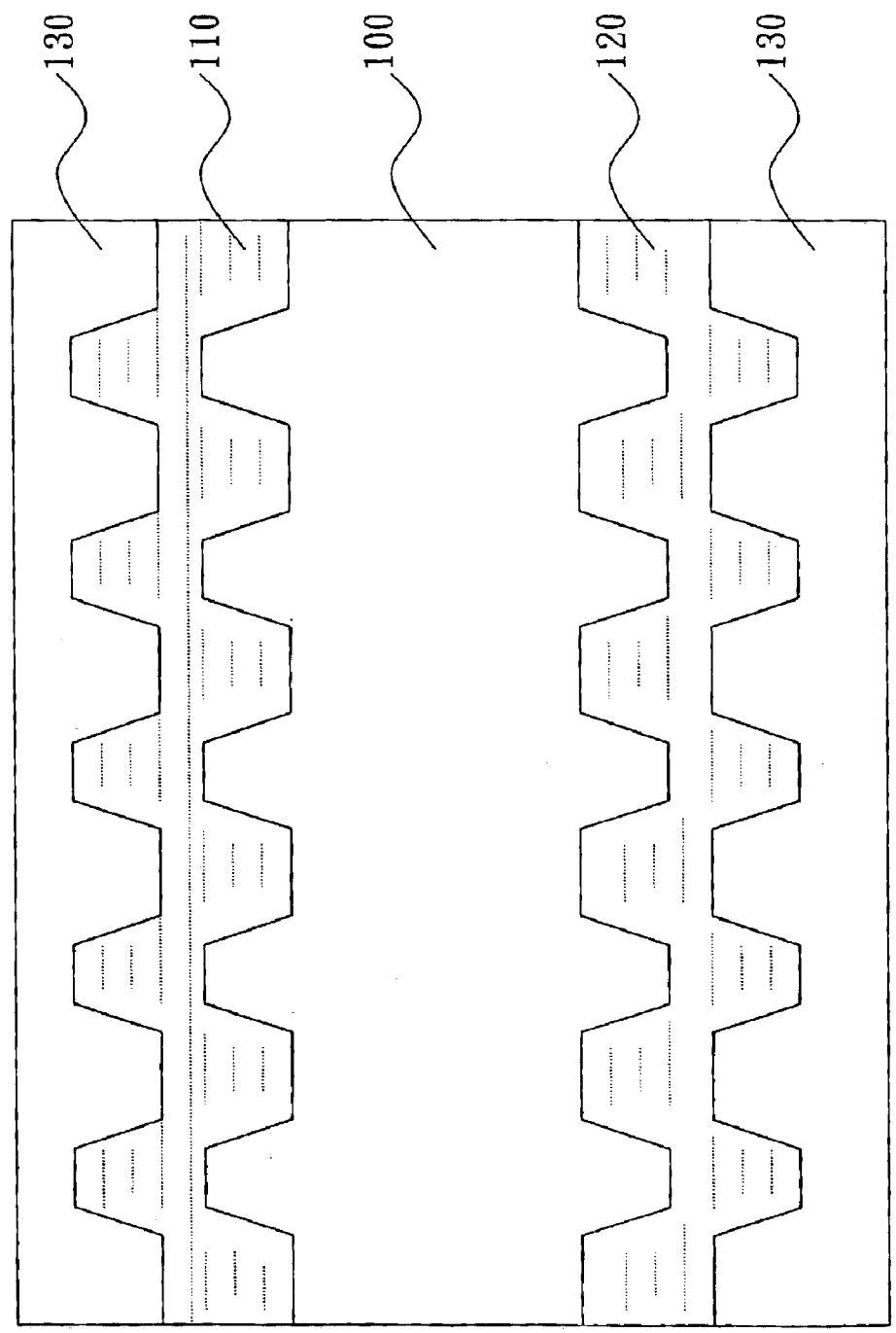
FIG. 1 is a schematic view of the structure according to the first embodiment.

With reference to FIG. 1, the first embodiment of the invention, take a substrate 100 with a land-and-groove surface on both sides. The land-and-groove surface on the top surface of the substrate 100 has a first recording stack 110, and the land-and-groove surface on the bottom surface of the substrate 100 has a second recording stack 120. The first recording stack 110 and the second recording stack 120 are further protected by a cover layer 130. The thickness of the cover layer 130 is between 70 μm and 1251 μm. One then obtains a double-sided high-density information storage medium with two recording layers. In particular, the first recording stack 110 and the second recording stack 120 are both comprised of at least one information recording layer.

Figure 2:
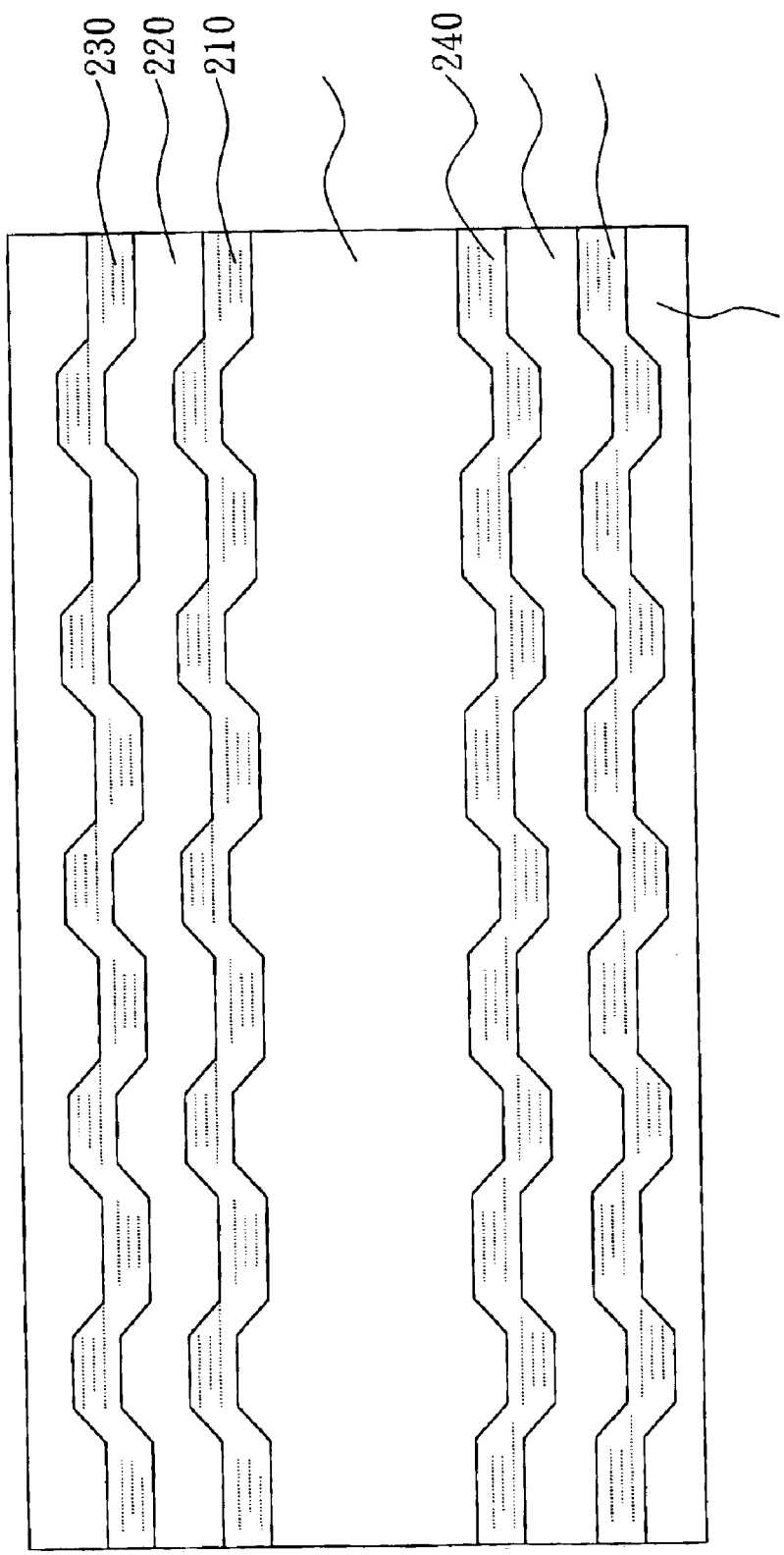
FIG. 2 is a schematic view of the structure according to the second embodiment.

The invention further provides a double-sided high-density information storage medium with four recording layers, as shown in FIG. 2, the second embodiment of the invention. Take a substrate 200 with a land-and-groove surface on both sides. The top land-and-groove surface of the substrate has a first recording stack 210 and a first separator layer 220 formed thereon. Afterwards, a mold is used to make another land-and-groove surface and a second recording layer 230 is formed on the first separator layer 220. The bottom land-and-groove surface is formed with a third recording stack 240. Similarly, a second separator layer 250 is formed on the surface of the third recording stack 240 with a land-and-groove surface. Then a fourth recording stack 260 is deposited on the second separator layer 250. The second recording stack 230 on the top surface and the fourth recording stack 260 on the bottom surface are covered with a cover layer 270 for protection. The thickness of the cover layer is between 70 μm and 125 μm. This then forms a double-sided high-density information storage medium with four recording layers. In particular, each of the recording stacks is comprised of at least one information recording layer. The thickness of the substrates in the first and second embodiments are between 0.85 mm and 1.3 mm. The preferred thickness is between 0.95 mm and 1.1 mm.

Figure 3:
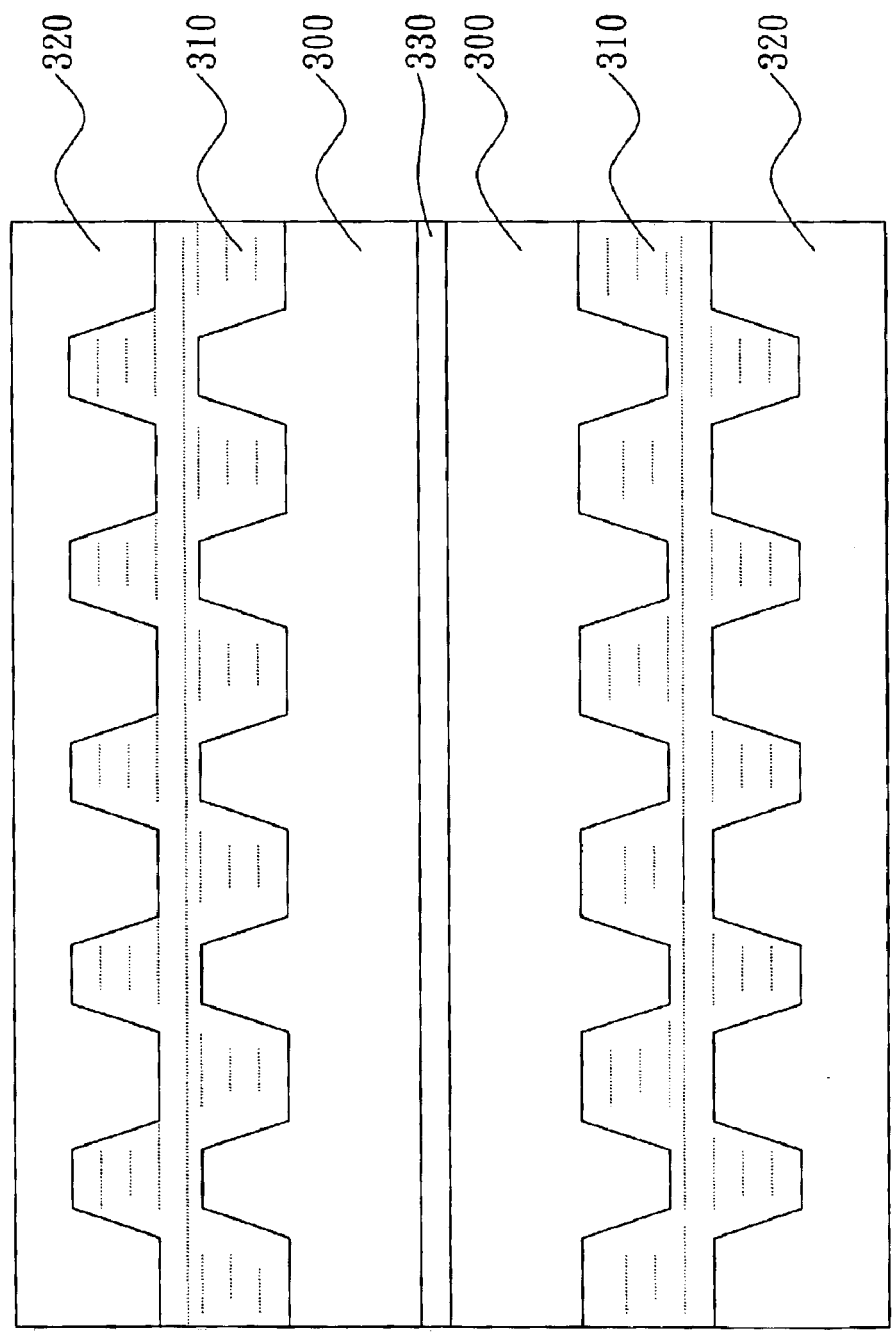
FIG. 3 is a schematic view of the structure according to the third embodiment.

The disclosed double-sided high-density information storage medium can be formed by adhering two substrates. Please refer to FIG. 3 for the third embodiment of the invention. Take a substrate 300 with a land-and-groove surface on a single side and a thickness between 0.45 mm and 0.6 mm. The land-and-groove surface is formed with a recording stack 310 comprised of at least one information recording layer. The top of the recording stack 310 is protected by a cover layer 320. The thickness of the cover layer 320 is between 70 μm and 125 μm. Afterwards, take two such substrates and make their land-and-groove surfaces face outward. Combining the two substrates using the other surfaces through an adhesive layer 330, one then obtains a double-sided high-density information storage medium with two recording layers.

Figure 4:
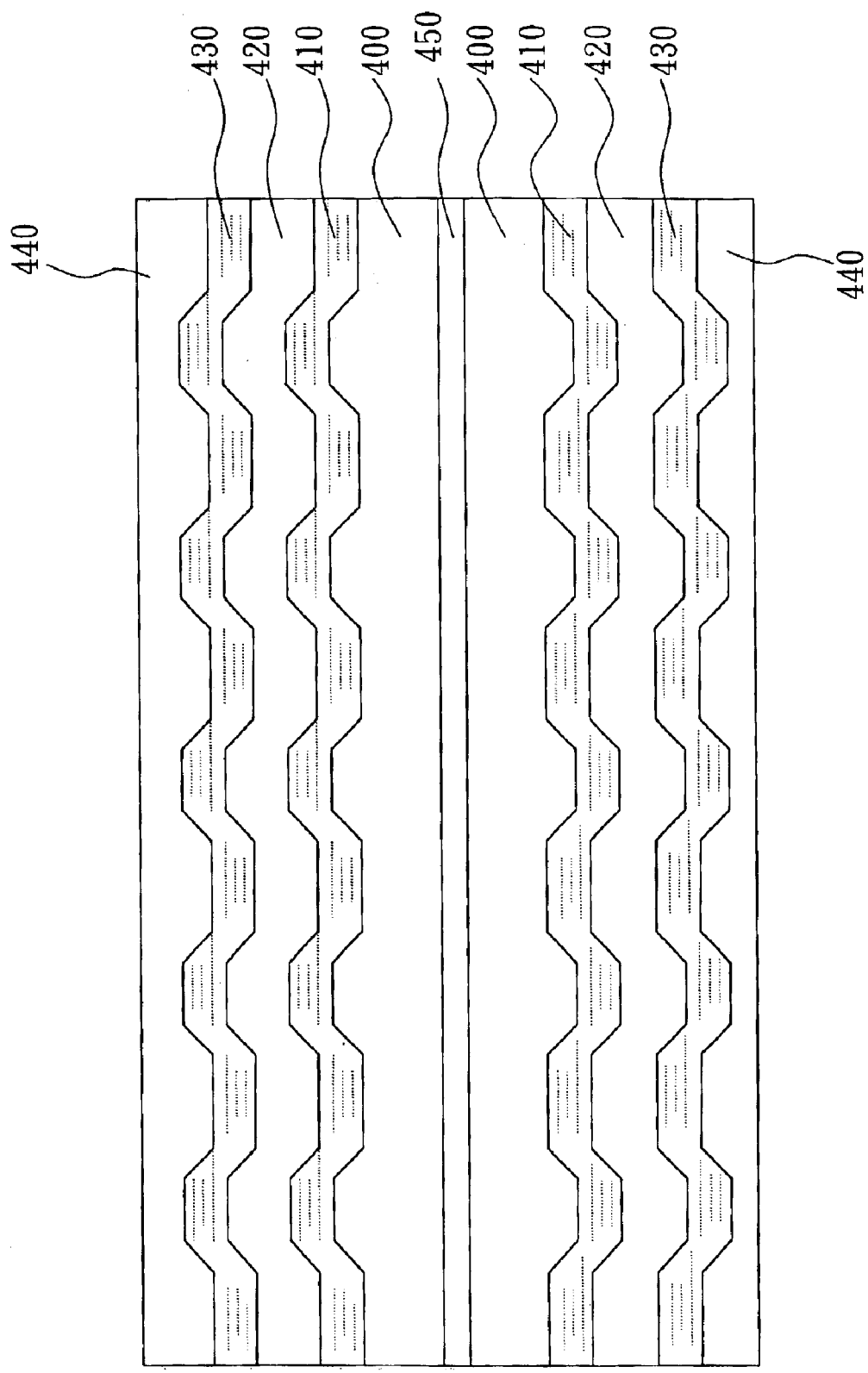
FIG. 4 is a schematic view of the structure according to the fourth embodiment.

One can use the above-mentioned to form a double-sided high-density information storage medium with four recording layers, as shown in the fourth embodiment (FIG. 4). Take a substrate 400 with a land-and-groove surface on a single side and form a recording stack 410 on the land-and-groove surface. The recording stack 410 is then deposited with a separator layer 420, which is then formed with another land-and-groove surface using a mold. The surface of the separator layer 420 is then formed with another recording stack 430. The recording stack thus separated by the separator layer 420 is comprised of at least one information recording layer. Two such substrates 400 are combined using an adhesive layer 450, with the land-and-groove surfaces facing outward. Finally, the top and bottom recording stacks are protected by a cover layer 440. This then provides the double-sided high-density information storage medium with four recording layers.

Moreover, the substrate used in the invention is made of a material selected from polycarbonate (PC), polymethylmethacrylate (PMMA), polymer resin, glass or aluminum. The separator layer for separating the recording stacks is made of epoxy, PMMA or polyester. Substrates can be fabricated using the fairly mature injection molding technology. The land-and-groove surface is made using mold copy.

Figure 5:
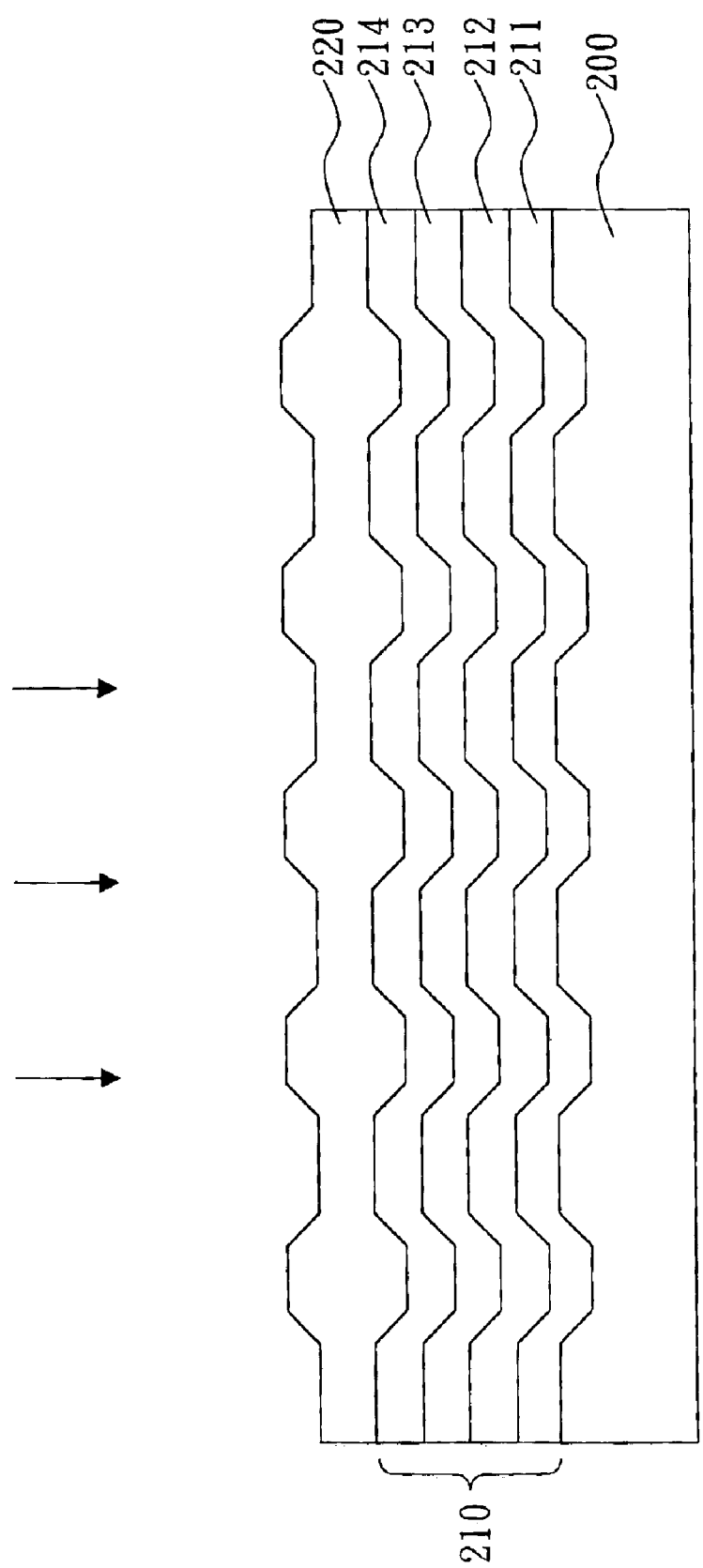
FIG. 5 is a schematic view of the structure of the first recording stack in FIG. 2.

Each recording stack in the invention consists of at least one information recording layer. Various kinds of materials can be used to make the information recording layers. One can choose from phase transition materials, organic materials or magneto-optical materials to achieve the goal of multiplayer recording. One can further insert optical/thermal enhanced layer, such as dielectric layers, metal layers, and thermal assistance layers. The material of the metal layer is selected from any combinatorial alloys of gold, silver, aluminum, chromium, nickel, and silicon. The structure of the first recording stack in the second embodiment is shown in FIG. 5. After the laser beam passes the first separator layer 220, it enters the first recording stack 210 on the surface of the substrate 200. The laser beam penetrates through in order, a dielectric layer 214 of 10 nm (nanometer) to 150 nm thick, a phase transition material recording layer 213 of 3 nm to 30 nm thick, a dielectric layer 212 of 10 nm to 150 nm thick, and finally a metal layer 211 of 30 nm to 200 nm thick.

The invention utilizes the available optical disk fabrication processes to make an information storage medium for a short-wavelength laser pickup head. The disclosed double-sided high-density information storage medium along with the short-wavelength laser pickup head can thus achieve high-density reading and recording. Similarly, an information storage medium with four recording stacks can be formed to provide high information storage capacity.

What is claimed is:

1. A double-sided high-density information storage medium whose data reading and recording is performed using a short-wavelength laser pickup head with a wavelength no longer than blue light, the double-sided high-density information storage medium comprising:
    a substrate, which has a top land-and-groove surface and a bottom land-and-groove surface;
    a first recording stack, which covers the top land-and-groove surface and consists of at least one information recording layer; and
    a second recording stack, which covers the bottom land-and-groove surface and consists of at least one information recording layer,
    wherein said first recording stack and said second recording stack read and recorded data by a laser pickup head with wavelengths shorter than or equal to blue light.

2. The double-sided high-density information storage medium of claim 1, wherein the material of the substrate is selected from the group consisting of polycarbonate (PC), polymethylmethacrylate (PMMA), polymer resins, glass, and aluminum.

3. The double-sided high-density information storage medium of claim 1, wherein the thickness of the substrate is between 0.85 mm to 1.3 mm.

4. The double-sided high-density information storage medium of claim 1, wherein the thickness of the substrate is preferably between 0.95 mm and 1.1 mm.

5. The double-sided high-density information storage medium of claim 1, wherein the substrate is formed by adhering together two plates with a land-and-groove surface on a single side.

6. The double-sided high-density information storage medium of claim 5, wherein the thickness of the substrate is between 0.4 mm and 0.65 mm.

7. The double-sided high-density information storage medium of claim 5, wherein the thickness of the substrate is preferably between 0.45 mm and 0.55 mm.

8. The double-sided high-density information storage medium of claim 1, wherein a cover layer is formed on the surface of each of the first recording stack and the second recording stack.

9. The double-sided high-density information storage medium of claim 1, wherein the material of the information recording layer is selected from the group consisting of phase transition materials, organic materials, and magneto-optical materials.

10. The double-sided high-density information storage medium of claim 1 further comprising an additional layer inserted in the recording stacks and selected from the group consisting of an optical enhanced layer and a thermal enhanced layer.

11. A double-sided high-density information storage medium with four recording layers whose data reading and recording is performed using a short-wavelength laser pickup head with a wavelength no longer than blue light, the double-sided high-density information storage medium comprising:

a substrate, which has a first top land-and-groove surface on its top surface and a first bottom land-and-groove surface on its bottom surface;

a first top recording stack, which covers the first top land-and-groove surface and consists of at least one information recording layer;

a first separator layer, whose one surface is stacked onto the first top recording stack surface and whose other surface is a second top land-and-groove surface;

a second top recording stack, which covers the second top land-and-groove surface and consists of at least one information recording layer;

a first bottom recording stack, which covers the first bottom land-and-groove surface and consists of at least one information recording layer;

a second separator layer, whose one surface is stacked onto the first bottom recording stack surface and whose other surface is a second bottom land-and-groove surface; and a second bottom recording stack, which covers the second bottom land-and-groove surface and consists of at least one information recording layer.

12. The double-sided high-density information storage medium of claim 11, wherein the material of the substrate is selected from the group consisting of polycarbonate (PC), polymethylmethacrylate (PMMA), polymer resins, glass, and aluminum.

13. The double-sided high-density information storage medium of claim 11, wherein the thickness of the substrate is between 0.85 mm to 1.3 mm.

14. The double-sided high-density information storage medium of claim 11, wherein the thickness of the substrate is preferably between 0.95 mm and 1.1 mm.

15. The double-sided high-density information storage medium of claim 11, wherein the substrate is formed by adhering together two plates with a land-and-groove surface on a single side.

16. The double-sided high-density information storage medium of claim 15, wherein the thickness of the substrate is between 0.4 mm and 0.65 mm.

17. The double-sided high-density information storage medium of claim 15, wherein the thickness of the substrate is preferably between 0.45 mm and 0.55 mm.

18. The double-sided high-density information storage medium of claim 11, wherein the thickness of the first separator layer and the second separator layer is between 0.1 $\mu$m and 100 $\mu$m.

19. The double-sided high-density information storage medium of claim 11, wherein the thickness of the first separator layer and the second separator layer is preferably between 10 $\mu$m and 40 $\mu$m.

20. The double-sided high-density information storage medium of claim 11, wherein a cover layer is formed on the surface of each of the first recording stack and the second recording stack.

21. The double-sided high-density information storage medium of claim 11, wherein the material of the information recording layer is selected from the group consisting of phase transition materials, organic materials, and magneto-optical materials.

22. The double-sided high-density information storage medium of claim 11 further comprising an additional layer inserted in the recording stacks and selected from the group consisting of an optical enhanced layer and a thermal enhanced layer.

* * * * *